Figure 1:
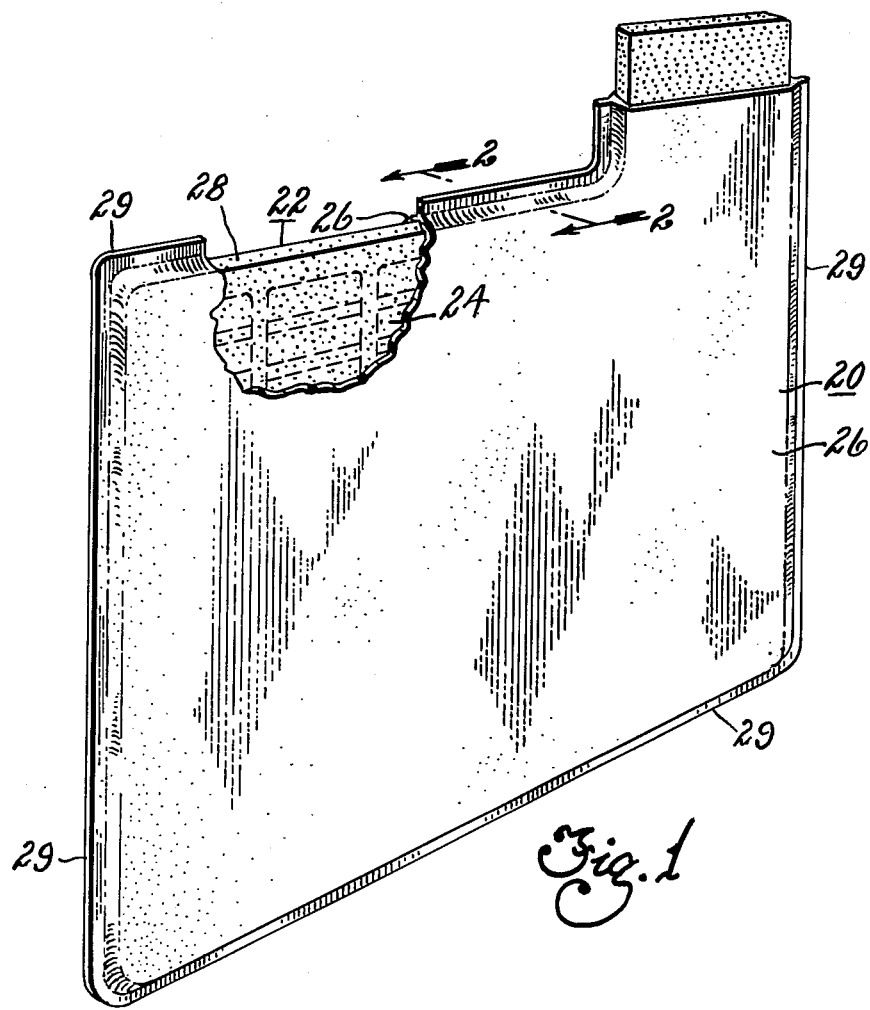

June 4, 1963

R. KRUGER, JR 3,092,438

PRODUCTION OF FILLED POLYOLEFIN MOLDING COMPOUND
AND THE MOLDING OF ARTICLES THEREFROM

Filed Nov. 9, 1959

2 Sheets-Sheet 1

INVENTOR.
RINE KRUGER JR.

BY John T. Martin

HIS ATTORNEY

INVENTOR.
Rine Kruger, Jr.

United States Patent Office 3,092,438
Patented June 4, 1963

3,092,438
PRODUCTION OF FILLED POLYOLEFIN MOLD-
ING COMPOUND AND THE MOLDING OF AR-
TICLES THEREFROM
Rine Kruger, Jr., Muncie, Ind., assignor to General Motors Corporation, Detroit, Mich., a corporation of Delaware
Filed Nov. 9, 1959, Ser. No. 851,670
6 Claims. (Cl. 18—47.5)

This invention relates to molding materials and is particularly concerned with storage battery separators and storage battery cases formed from polyolefins together with an inert filler.

It is an object of this invention to provide a method for making battery separators which are microporous in nature from a combination of a finely divided filler material such as alpha cellulose, diatomaceous earth, silica gel, bentonite or the like together with a binder material taken from the class consisting of the polyolefins wherein the binder material is formed in situ onto the surfaces of the filler material to completely occlude the fibers or particles of the filler.

In carrying out the above object, it is a further object to utilize mono-olefinic materials taken from the class consisting of ethylene, propylene, or ethylene-propylene combinations and to polymerize these materials in situ in the presence of a mixture of ethyl aluminum sesquibromide and an organic titanate onto and around filler material fibers or particles to form a slurry which can be washed and sheeted into battery plate separator form and sintered to form strong flexible microporous battery separators.

A still further object of the invention is to utilize the material hereinbefore noted for application directly to the positive plate of a storage battery wherein the material is sheeted and pressed onto both sides of the plate and sintered thereto to form a coextensive envelope or capsule over and around the active material carried by the plate, thereby eliminating the necessity of individual battery plate separators which concomitantly eliminates the possibility of shedding of active positive material during the use of the battery.

Another object of the invention is to encapsulate particles of carbon black or coal dust in a polyolefin formed in situ for the mono-olefinic gas in a carrier solution in the presence of a catalyst material consisting of ethyl aluminum sesquibromide and an organic titanate, separate said encapsulated particles from the carrier solution and to then mold the said encapsulated particles under pressure at elevated temperatures into articles having high impact strength.

Further objects and advantages of the present invention will be apparent from the following description, reference being had to the accompanying drawings wherein preferred embodiments of the present invention are clearly shown.

Figure 2:
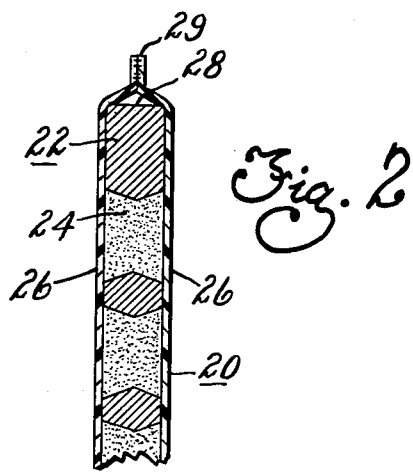
Figure 3:
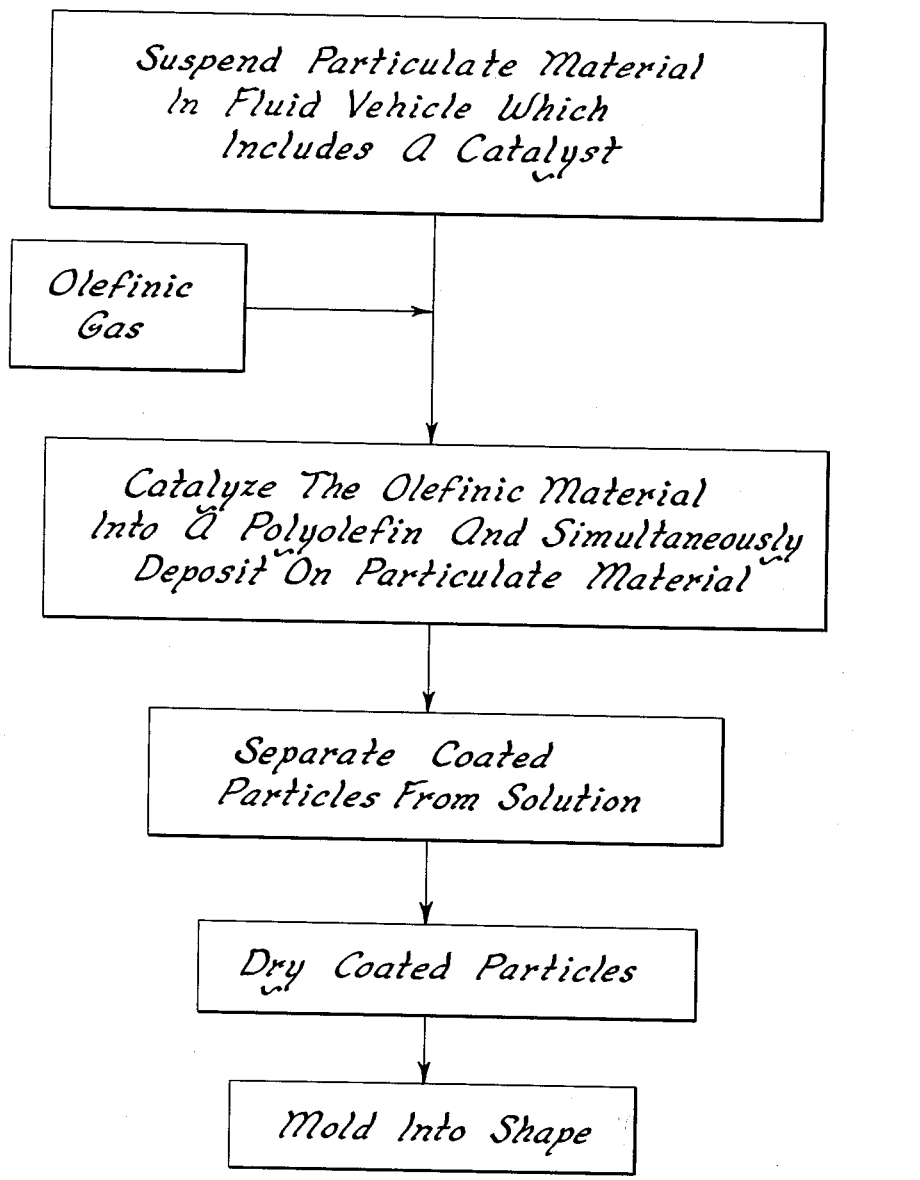

In the drawings:

FIGURES 1 and 2 show an encapsulated positive plate for use in a storage battery wherein the plate is covered coextensively by means of an applied envelope or capsule of microporous polyolefinic material and FIGURE 3 is a flow chart illustrating the process claimed herein.

As an example of one use of the molding material, a battery sepaartor will be cited. In the past, battery plate separators having satisfactory electrical characteristics have proved to be rather expensive. Microporous rubber separators are in this category and, while offering highly successful results, are nevertheless expensive and are quite fraglie which results in extensive breakage during assembly of the separators.

Attempts have been made to form separators from plastic materials utilizing polymerized molding powders and the like which may or may not be mixed with fillers and which are then sheeted and bonded together into battery separators. These materials, while yielding useful results, have frequently failed due to improper coating of the filler material whereby the filler material is exposed to the oxidizing environment of the battery acid during use which causes deterioration of the separator and often results in treeing therethrough. These separators, for the most part, are formed from polystyrene and polyethylene materials and include cellulose or diatomaceous earth as a filler material. Furthermore, due to the presence of the fillers in these separators, and nonuniform mixing of the binder therewith, the strength of the separator is rather low due to the fact that there is no continuous plastic framework.

The present invention is directed to a method for forming a plastic separator wherein the plastic material is in the continuous phase and wherein the filler therefor is in the dispersed phase and is completely occluded by the plastic material.

My invention overcomes these past difficulties. I accomplish this end by utilizing a monomer of the polymeric material to be used for the continuous phase in the separator and then mix the filler material with this monomer whereupon a polymerization reaction is initiated in the presence of a catalyst to form the polymer in situ over and around each and every particle or fiber of the filler material. This product is later sheeted and sintered together to join the polymeric material at its contacting portion and form a separator of the type desired. Specifically, the starting materials which I prefer to use are olefins such as ethylene, propylene and mixtures of the two. These materials are gaseous in nature and are quite easily handled to accomplish the desired result. In this connection, the filler material to be used, for example, alpha cellulose fibers, silica gel, diatomaceous earth, bentonite, etc., is suspended in an aromatic solvent such as toluene, xylene, heptane, for example, together with a catalyst which may be any one of a number of organic salts of titanium, aluminum or magnesium. This mixture is placed in an autoclave under moderate pressure in the order of ten to twenty pounds per square inch and the ethylene or propylene gas, as the case may be, is bubbled through the solution for a time sufficient to form polyethylene or polypropylene in situ. This in situ formation occurs directly onto the fibers or particles of the filler material held in the suspension by the agitation of the carrier liquid whereby these materials are occluded completely by the polyolefin. After the process is stopped, the coated particles or fibers are filtered from the remainder of the solution and are washed with methanol whereupon a plastic molding powder is provided which can subsequently be sheeted and sintered in the desired shape at conventional temperatures.

Separators formed by this process are completely resistant to battery acid, have a higher degree of flexibility than any separator heretofore manufactured and have a microporous nature controlled by the particle size of the starting material and the compacting pressure used during the formation of the separator. Separators made by this process should be treated in an aqueous solution of a suitable wetting agent and subsequently dried prior to use.

Alternately, after the particles are washed in methanol as they come from the autoclave, they may be directly suspended in an aqueous solution including the wetting agent and then sheeted out under conventional papermaking procedures, dried and sintered to form separators.

Specific examples of the method for making a molding powder are as follows:

Example 1

500 cc. of normal heptane was mixed with 100 grams of alpha cellulose, 5 cc. of ethyl aluminum sesquibromide and 3.6 cc. of tetra 2 ethylhexylorthotitanate under non-oxidizing conditions. This mixture was then stirred while ethylene gas was bubbled through the solution. A solid polymer began to separate at once and the exotherm of the mixture was controlled so that the temperature thereof was maintained between 120° F. and 140° F. The gas was bubbled through the mixture for about two hours at a rate sufficient to produce a final product including about 100 grams of polyethylene. The residue consisting of cellulose completely coated with polyethylene was recovered by filtration and washed with methyl alcohol. The polyethylene was of the high density type having a density in excess of .95 at 68° F.

Example 2

500 cc. of normal heptane was mixed together with 100 grams of diatomaceous earth, 5 cc. of ethyl aluminum sesquibromide and 5 cc. of tetratridecylorthotitanate under nonoxidizing conditions. This mixture was then stirred while ethylene gas was bubbled through the solution. A solid polymer began to separate at once and the exotherm of the mixture was controlled so that the temperature thereof was maintained between 120° F. and 140° F. The gas was bubbled through the mixture for about two hours at a rate sufficient to produce a final product including about 100 grams of polyethylene. The diatomaceous earth completely coated with polyethylene was recovered by filtration and washed with methyl alcohol. The polyethylene was of the high density type having a density in excess of .95 at 68° F.

Example 3

500 cc. of normal heptane was mixed together with 100 grams of silica gel, 5 cc. of ethyl aluminum sesquibromide and 3.7 cc. of tetralaurylorthotitnate under nonoxidizing conditions. This mixture was then stirred while a mixture of ethylene and propylene gases in equal volumetric proportion were bubbled through the solution. A solid polymer began to separate at once and the exotherm of the mixture was controlled so that the temperature thereof was maintained between 120° F. and 140° F. The gases were bubbled through the mixture for about two hours at a rate sufficient to produce a final product including about 100 grams of polyethylene-polypropylene copolymer. The silica gel completely coated with polyethylene-polypropylene copolymer was recovered by filtration and washed with methyl alcohol.

Example 4

500 cc. of normal heptane was mixed together with 100 grams of bentonite, 5 cc. of ethylene aluminum sesquibromide and 3.6 cc. of tetra 2 ethylhexylorthotitanate under nonoxidizing conditions. This mixture was then stirred while propylene gas was bubbled through the solution. A solid polymer began to separate at once and the exotherm of the mixture was controlled so that the temperature thereof was maintained between 120° F. and 140° F. The gas was bubbled through the mixture for about two hours at a rate sufficient to produce a final product including about 100 grams of polypropylene. The bentonite completely coated with polypropylene was recovered by filtration and washed with methyl alcohol. The polypropylene was of the high density type.

The product of any of the foregoing Examples 1 through 4 may be sheeted either from an aqueous solution including a wetting agent such as trimethyl nonyl ether of polyethylene glycol or other suitable high temperature wetting agents on screen using conventional paper-making techniques and this layer is then formed and sintered at temperatures in the order of 300° F.±10°. During this sintering procedure, the contiguous surfaces of the particles firmly bond together to form a strong network of the polyolefin wherein the cellulose or diatomaceous earth, etc., is occluded therein as a filler. Since the melting point of the materials are not exceeded during the sintering operation, considerable microporosity exists between the sintered particles. This may be controlled by compacting as desired during the sintering operation.

Another form of my invention is directed to the production of an envelope type positive plate wherein the positive plate, as shown at 20 in FIGURES 1 and 2, comprises a grid 22 having active material 24 held within the pockets thereof. This grid is then placed in a mold with a sheet 26 of presintered separator material having an average thickness of about .030 of an inch on either side thereof and extending over the edges 28 thereof. The assembly is then compressed at the edge portions 29 with heat to seal the edge portions and form a continuous envelope around the plate. When this procedure is utilized, no additional separators are required in the battery since each positive plate includes its own envelope of microporous material.

This structure has the added feature of providing a bag or collector around the positive plate which prevents the shedding of active material from the plate whereby the over-all dimensions of the battery case may be reduced to eliminate the sediment pockets normally provided at the bottom thereof.

Another example of the use of this material and method is in the manufacture of containers, such as battery cases and the like. In this instance, the filler material may be carbon black or coal dust, preferably carbon black. This solid material was suspended in normal heptane as in the other examples wherein a catalyst comprising 5 cc. of ethyl aluminum sesquibromide and 3.6 cc. of tetra 2 ethylhexylorthotitanate was present. The ethylene gas was bubbled through the solution and a solid polymer began to separate wherein the exotherm of the reaction was controlled so that the temperature was maintained between 120° F. and 140° F. The gas was bubbled through the suspension for about two hours at a rate sufficient to produce a final product including about 100 grams of polyethylene. This product residue consisted of carbon black completely encapsulated with polyethylene and was removed by filtration and washed with methyl alcohol. The polyethylene had a density of about .95 at 68° F. This material was then used in the manufacture of a battery case wherein a normal mold was heated by steam to a temperature of about 310° F. and wherein the encapsulated carbon black was injected into the mold cavity under ram pressures in the order of 2000 pounds per square inch. After the molding was completed, the steam was shut off and cooling water was circulated through the mold until the mold temperature reached 110° F. to 120° F. whereupon the press was opened and the case was removed. Battery cases molded under these procedures had a slightly lower density than conventional hard rubber compounds wherein the density of the polyethylene-carbon black material was about 1.12 against 1.3 for hard rubber. The new battery case was more resistant to battery acids at elevated temperatures than hard rubber cases and was more than twenty times as resistant to impact as a hard rubber case. In fact, the impact resistance of the case was so outstanding that the test equipment used for hard rubber cases was incapable of causing fracture of the polyethylene encapsulated carbon black case. In this instance, an Izod one-half inch by one-half inch impact bar molded of the encapsulated carbon black did not fail at 200 inch pounds which was the limit of the machine whereas a standard hard rubber test bar under similar test conditions failed at 7 to 10 inch pounds.

It is apparent that the strength and impact resistance of the solid molded material will vary with the loading and the above tests were made wherein the carbon black may range between 20% to 80% of the molding powder with the remainder being polyethylene.

It is also apparent that this material may be cheapened by using coal dust as the filler material and that various types of containers that require acid resistance and/or high impact strength may be made by similar molding processes as are well known in the art.

While the embodiments of the present invention as herein disclosed constitute preferred forms, it is to be understood that other forms might be adopted.

What is claimed is as follows:

1. In a method for making an acid resisting molding compound, comprising the steps of; forming a polyolefin taken from the class consisting of polyethylene, polypropylene and copolymers thereof in situ from a monomeric material directly upon the surfaces of a filler material suspended in a non aqueous liquid which includes a catalytic material comprising ethyl aluminum sesquibromide and a titanate taken from the class consisting of tetra 2 ethylhexylorthotitanate, tetratridecylorthotitanate, and tetralaurylorthotitanate, said filler material being taken from the class consisting of alpha cellulose, diatomaceous earth, silica gel, bentonite, carbon black and coal dust, removing the thus coated particles of filler material from said liquid and drying the material to form a molding composition consisting of discrete particles of filler material having a complete and continuous coating thereover of the polyolefin.

2. In a method for making an acid resisting molding compound, comprising the steps of; forming polyethylene directly from ethylene gas upon the surfaces of a filler material suspended in a non aqueous liquid which includes a catalytic material comprising ethyl aluminum sesquibromide and a titanate taken from the class consisting of tetra 2 ethylhexylorthotitanate, tetratridecylorthotitanate and tetralaurylorthotitanate, said filler material being taken from the class consisting of alpha cellulose, diatomaceous earth, silica gel, bentonite, carbon black and coal dust, removing the thus coated particles of filler material from said liquid and drying the material to form a molding composition consisting of discrete particles of filler material having a complete and continuous coating thereover of the polyethylene.

3. In a method of making a battery plate separator, the steps comprising; forming an acid resisting polyolefin taken from the class consisting of polyethylene, polypropylene and copolymers thereof, in situ from a monomeric material directly upon the surfaces of a filler material suspended in a non aqueous liquid together with a catalyst consisting of ethyl aluminum sesquibromide and an organic titanate taken from the class consisting of tetra 2 ethylhexylorthotitanate, tetratridecylorthotitanate and tetralaurylorthotitanate, said filler material being taken from the class consisting of alpha cellulose, diatomaceous earth, silica gel and bentonite, removing the thus coated discrete particles of filler material from said liquid, forming the coated material into a mat and then sintering the mat to form a microporous battery separator consisting of a continuous phase of the polyolefin having the filler material in a dispersed phase therethrough.

4. In a method of making a battery plate separator, the steps comprising; forming polyethylene directly from ethylene gas upon the surfaces of comminuted material suspended in a non aqueous liquid carrier together with a catalyst consisting of ethyl aluminum sesquibromide and an organic titanate taken from the class consisting of tetra 2 ethylhexylorthotitanate, tetratridecylorthotitanate and tetralaurylorthotitanate, wherein the filler material is taken from the class consisting of alpha cellulose, diatomaceous earth, silica gel and bentonite, separating the coated, comminuted material from the suspension fluid, forming the coated material of discrete particles into a mat and sintering the mat to form a microporous battery separator consisting of a continuous phase of polyethylene having the alpha cellulose in a dispersed phase therethrough.

5. In a method of making a battery plate separator, the steps comprising; suspending alpha cellulose in heptane together with a catalytic material consisting of ethyl aluminum sesquibromide and an organic titanate taken from the class consisting of tetra 2 ethylhexylorthotitanate, tetratridecylorthotitanate and tetralaurylorthotitanate, bubbling ethylene into the solution and controlling the temperature so as to maintain the temperature below the boiling point of heptane, continuing the bubbling of ethylene gas therein until polyethylene has been formed in situ upon the particles of alpha cellulose in quantities by weight substantially equal to the weight of the alpha cellulose used, separating the discrete coated particles of alpha cellulose from the solution, drying the same, and then sheeting the dried particles and sintering at a temperature in the order of 300° F. to form a microporous battery plate separator.

6. In a method of forming a container having high impact strength and acid resistance, the steps comprising; suspending a filler material taken from the class consisting of carbon black and coal dust in a liquid organic carrier together with a catalyst comprising ethyl aluminum sesquibromide and a titanate taken from the class consisting of tetra 2 ethylhexylorthotitanate, tetratridecylorthotitanate and tetralaurylorthotitanate, bubbling ethylene gas into said solution under temperature conditions below the boiling point of the carrier for a time sufficient to form polyethylene in situ upon the particles of the filler material, separating the discrete coated particles of filler material from the solution, drying the same and then molding these particles into a container under high pressure and at temperatures in the order of 300° F. to 310° F. to form a nonporous container having high impact strength and acid resistance.

References Cited in the file of this patent

UNITED STATES PATENTS

| | | |
|---|---|---|
| 2,171,765 | Rohm et al. | Sept. 5, 1939 |
| 2,564,397 | Duddy | Aug. 14, 1951 |
| 2,736,925 | Heisler et al. | Mar. 6, 1956 |
| 2,824,090 | Edwards et al. | Feb. 18, 1958 |
| 2,866,760 | Haessler | Dec. 30, 1958 |
| 2,876,133 | Iler | Mar. 3, 1959 |
| 2,952,656 | Zomlefer | Sept. 13, 1960 |

FOREIGN PATENTS

| | | |
|---|---|---|
| 573,357 | Canada | Mar. 31, 1959 |